United States Patent
Murakami et al.

[11] Patent Number: 6,137,964
[45] Date of Patent: Oct. 24, 2000

[54] CAMERA HAVING A FILM STRIP PROTECTION SYSTEM

[75] Inventors: Hiroshi Murakami, Utsunomiya; Nobuaki Sasagaki, Yokohama, both of Japan

[73] Assignee: Nikon Corporation, Tokyo, Japan

[21] Appl. No.: 08/966,562

[22] Filed: Nov. 10, 1997

[30]     Foreign Application Priority Data

Nov. 27, 1996 [JP] Japan .................................. 8-316644

[51] Int. Cl.⁷ .................................................. G03B 17/24
[52] U.S. Cl. .......................................................... 396/538
[58] Field of Search ..................................... 396/538, 536

[56]             References Cited

U.S. PATENT DOCUMENTS

| | | | |
|---|---|---|---|
| 5,546,150 | 8/1996 | Wada et al. | 396/538 |
| 5,708,900 | 1/1998 | Yokoyama et al. | 396/538 |
| 5,809,359 | 9/1998 | Taku | 396/538 |
| 5,812,897 | 9/1998 | Nishio | 396/538 |

OTHER PUBLICATIONS

Sales brochure entitled "Nikon Pronea 6 IIX240 Single-Lens Reflex" published by Nikon Corporation, Copyright 1996, pp. 1–23.

*Primary Examiner*—David M. Gray
*Attorney, Agent, or Firm*—Erik B. Cherdak & Associates, LLC

[57]             ABSTRACT

A camera includes a film strip protection system disposed within a film cartridge compartment. A film strip is maintained by a film cartridge. The film strip and the film cartridge are movable within the film cartridge compartment. The camera further includes a film strip guide unit for guiding the film strip when it extends from the film cartridge. The film strip protection system is configured to restrict the movement of the film strip to prevent the film strip from being damaged by the film strip guide unit.

40 Claims, 12 Drawing Sheets

CAMERA HAVING A FILM STRIP PROTECTION SYSTEM

BACKGROUND OF THE INVENTION

1. Field of the Invention

The present invention relates to cameras that utilize film cartridges.

2. Description of the Related Art

Advanced photo system (APS) cameras have become quite popular among photography enthusiasts. Such cameras allow users to enjoy many benefits over prior photographic systems. For example, aside from allowing multiple imaging formats, APS cameras allow users to easily load film cartridges without having to handle or manage film strips. To achieve such benefits, APS cameras typically include film cartridge assemblies that automate the loading and support of film cartridges and the advancement of film strips during film exposure and movement operations.

Although APS film cartridges are easier to load than conventional film cartridges, certain problems have been realized with regard to film strip safety. In particular, because of the tight spaces involved in the typical APS camera, there is little tolerance for improper movement of a film strip that might result when a camera is hit or bumped unexpectedly. Such little tolerance for film strip movement is exacerbated by the fact that film cartridges that maintain such film strips are allowed, and often designed to move within corresponding compartments. As such, when a film strip extends from a film cartridge, the film strip may be forced to move when the film cartridge moves. If the film cartridge is forced to move beyond a certain distance, the film strip may become damaged if it improperly contacts other camera structures such as film strip guide members and the like. The damage that can result from such improper film strip movement includes creases, rips, tears, and scratches.

Figure 1A:
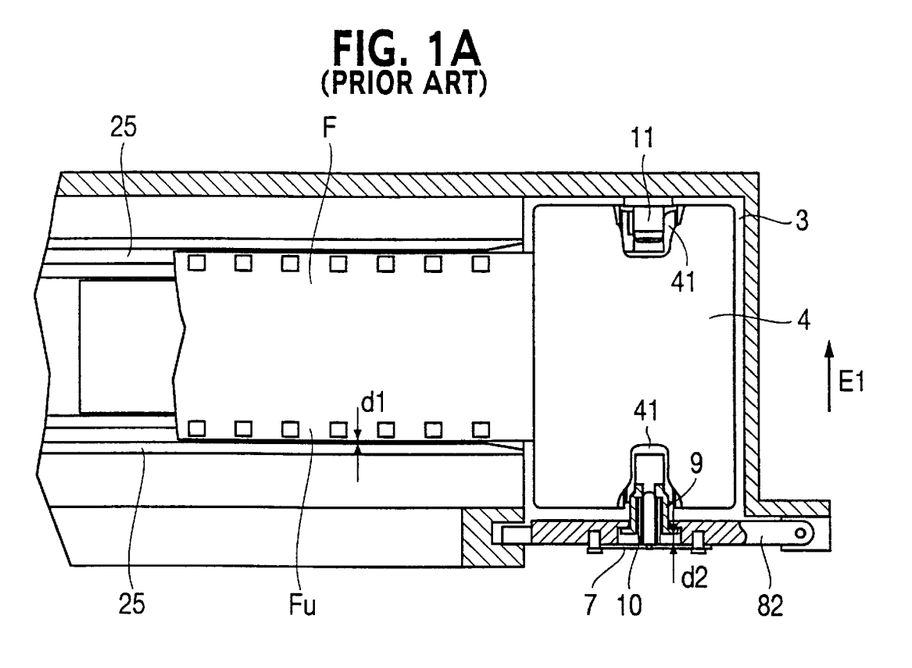
FIG. 1A is a diagram of a film cartridge compartment of a camera according to the prior art as described above.
Figure 1B:
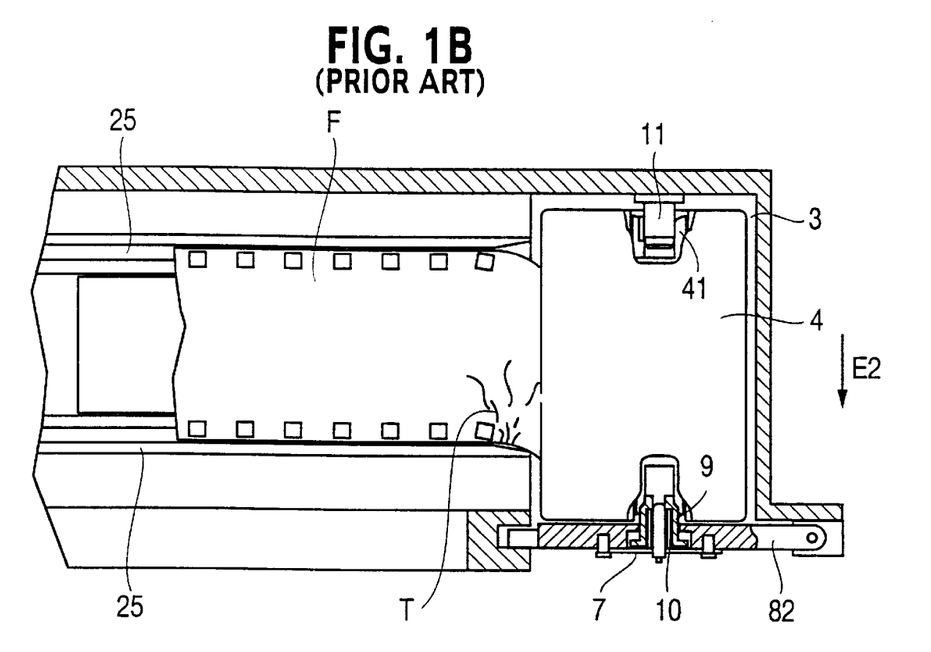
FIG. 1B is another diagram of the film cartridge compartment depicted in FIG. 1A.

To further illustrate the aforementioned problems, attention is directed to drawing FIGS. 1A and 1B which are attached hereto. Depicted in FIGS. 1A and 1B are views of a film cartridge compartment taken from backside of a typical bottom-load type APS camera. The camera utilizes a film strip F maintained by an APS type film cartridge 4. Film cartridge 4 is maintained within film cartridge compartment 3 which has been closed in accordance with a cartridge compartment cover 82. Cartridge compartment cover 82 allows access to film cartridge 4 from the bottom of the camera. In FIG. 1A, the camera can be said to be in a "normal" state in that it has not yet been acted upon by a jarring force such as one resulting from an unexpected movement.

In film cartridge compartment 3, film cartridge 4 is supported by an upper spindle 11 which cooperatively engages with an upper end of a film windup shaft 41 (hereinafter "shaft 41") which is axially disposed within and accessible from the ends of film cartridge 4. A lower spindle 9 supports a lower end portion of shaft 41. Additionally, lower spindle 9 urges shaft 41 upward and toward upper spindle member 11 (i.e., in the direction specified as E1—the direction corresponding to the width of film strip F) in accordance with a spring 10.

During normal operation, a gap or space having dimension d1 is present between a bottom portion Fu of film strip F and a film guide rail 25. Another gap or space having dimension d2 is also present between a base plate 7 and the bottom portion of lower spindle 9 which results from spring 10 urging lower spindle 9 toward upper spindle 11. Normally, dimension d2 is larger than dimension d1. As such, the difference between the relative dimensions d1 and d2 has resulted in a serious problem with regard to film strip safety which is illustrated in FIG. 1B.

In FIG. 1B, the camera has been acted upon by a force such as one resulting from an impact that occurred during transport. As such, film cartridge 4 was caused to move in a downward direction (identified as direction E2). The impact to the camera was significant enough to act against and overcome the urging force of spring 10 thereby causing film cartridge 4 to move toward lower spindle 9. Accordingly, because film cartridge 4 moved, so too did film strip F. Because dimension d2 is larger than dimension d1, film cartridge 4 was allowed to move a distance equal to dimension d2. As such, film strip F became damaged (e.g., creased, torn, etc.) at trauma point T because film strip F (and, in particular, bottom portion Fu) was forced to come into contact with a guide rail system and film advancement channel defined, in part, by lower guide rail 25.

Additionally, the aforementioned problems associated with vertical movement of a film strip may be exacerbated by the fact that spindle 9 can also rock or tilt as a result of having a relatively large distance over which to move (i.e., a distance equal to dimension d2). If spindle 9 rocks or tilts, film cartridge 4 and film strip F can correspondingly move within film cartridge compartment 3 thereby increasing the likelihood of damage to film strip F.

Accordingly, there exists a need for new and improved systems for preventing damage to film strips that retractably extend from film cartridges. Without such new and improved systems, camera users will continue to run the risk of having their pictures destroyed due to film strip damage that may result from camera movement.

SUMMARY OF THE INVENTION

In view of the preceding comments, it is a principal object of the present invention to solve the aforementioned problems associated with film strip safety by providing a film strip protection system for use in cameras that utilize film cartridges.

It is another object of the present invention to provide a film strip protection system for a camera that limits the amount of movement of a film strip during periods of camera movement.

It is still another object of the present invention to provide a film strip protection system for a camera that prevents damage to a film strip that could otherwise result from camera movement.

In achieving its objects, the present invention provides many benefits. For example, including a film strip protection system within a camera according to the present invention will enable photography enthusiasts and camera users to preserve and enjoy their photographs even after their cameras have experienced unexpected impacts that would have otherwise caused film strips that may contain undeveloped photographs to become damaged.

The present invention achieves its objects and provides the aforementioned benefits by providing a film strip protection system for a camera. The film strip protection system is configured to operate within a camera that includes a film strip guide member for guiding a film strip when the film strip extends from a film cartridge. The film strip protection system includes a movement prevention system maintained within a film cartridge compartment of the camera. The movement prevention system prevents the film strip from improperly contacting the camera's film strip guide member.

According to another aspect of the present invention, a camera is provided that is adapted to accept a photographic film cartridge that maintains a film strip. The film strip is configured to extend from and retract into the film cartridge. The camera includes a film strip guide unit for maintaining and guiding the film strip as it extends over a camera aperture area. The camera also includes a movement prevention system for preventing the film strip from improperly contacting the film strip guide unit.

According to another aspect of the present invention, a camera is provided that includes a film cartridge holder for holding a film cartridge that maintains a film strip. The film cartridge holder has a first support member that supports a first end of the film cartridge and a second support member that supports a second end of the film cartridge. The second support member urges the film cartridge in a direction toward the first support member. Also included is a limiting unit that limits the movement of the film cartridge and the film strip when the film strip extends from the film cartridge. The limiting unit also limits the movement of the film cartridge and the film strip in a direction toward the second support member.

Finally, according to another aspect of the present invention, a camera is provided that includes a film cartridge compartment for maintaining a film cartridge having a film strip disposed therein. The film cartridge is movable within the film cartridge compartment. Additionally, the film strip is configured to retractably extend from the film cartridge. Also included is a film strip guide unit for guiding the film strip when the film strip extends from the film cartridge, and a film strip protection system disposed within the film cartridge compartment for restricting the movement of the film cartridge to prevent the film strip from improperly contacting and being damaged by the film strip guide unit.

BRIEF DESCRIPTION OF THE DRAWING FIGURES

The present invention is described below with reference to the following drawing figures, of which.

DETAILED DESCRIPTION OF THE PREFERRED EMBODIMENTS

The present invention is now described with referenced to the drawing figures that were briefly described above. Unless otherwise specified, like parts are referred to with like reference numerals. A description of the structure of each preferred embodiment is followed by a discussion of its corresponding operation.

Figure 2:
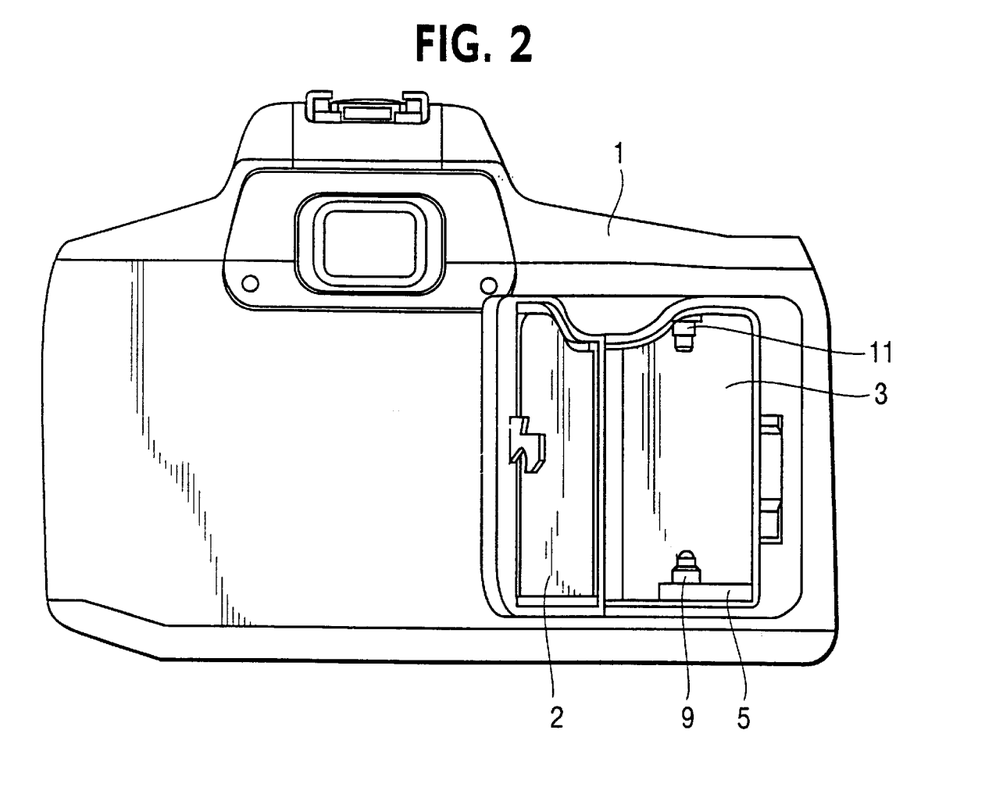
FIG. 2 is a diagram of a camera having a film strip protection system according to the present invention.

Referring now to FIG. 2, depicted therein is diagram of a camera incorporating a film strip protection system according to the present invention. In particular, at the back of a camera 1 (e.g., an advanced photo system "APS" camera such as one similar to the NIKON PRONEA 6i APS camera—model number IX 240), a film cartridge compartment 3 is revealed. Film cartridge compartment 3 has an open film cartridge compartment cover 2. Also shown, is an upper spindle 11, a lower spindle 9, and part of an opening and closing lever 5. Upper spindle 11 and lower spindle 9 are configured to be operatively inserted into corresponding receiving ends or cavities of an APS film cartridge's axial film wind-up shaft (not shown). Spindles 9 and 11 support such a film cartridge when the same is loaded into film cartridge compartment 3.

As will be discussed below, opening and closing lever 5 forms an integral part of a film strip protection system that is incorporated into camera 1 to achieve the above-stated objects and to provide the above-described benefits. The other parts that work in conjunction with opening and closing lever 5 to provide a film strip protection system according to the present invention are described in detail below.

The structure of a first preferred embodiment of a film strip protection system that has been incorporated into camera 1 and, in particular, into film cartridge compartment 3 is illustrated in FIGS. 3–6. The operation of the first preferred embodiment is discussed below with reference to FIGS. 7A and 7B.

Figure 3:
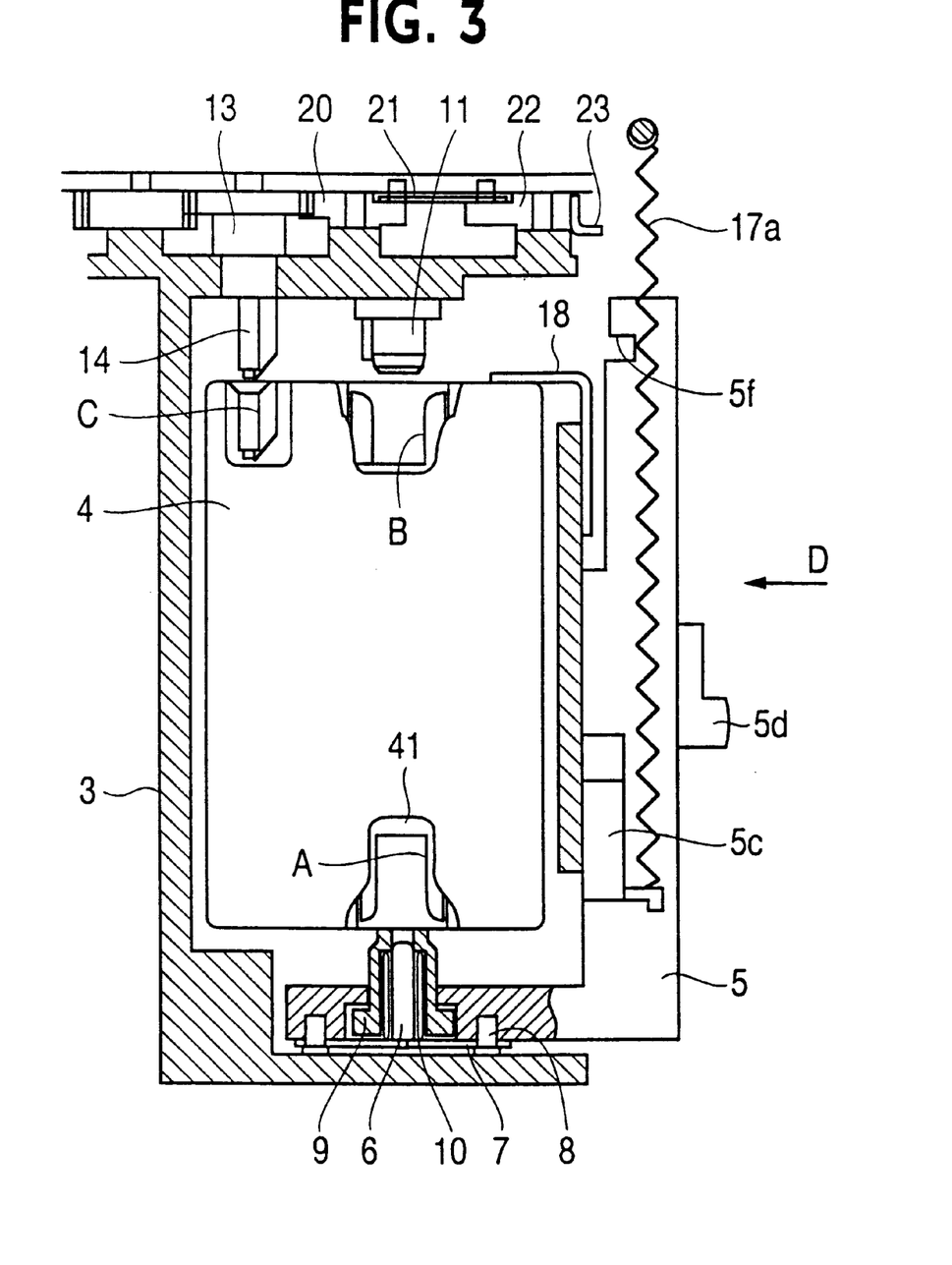
FIG. 3 is a diagram of a film strip protection system maintained within the film cartridge compartment of the camera depicted in FIG. 2 according to a preferred embodiment of the present invention.

Referring now to FIG. 3, depicted therein is the structure of a film strip protection system that has been incorporated into film cartridge compartment 3 of camera 1. In particular, film cartridge compartment cover 2 (as shown in FIG. 2) has been opened to allow access to film cartridge compartment 3 for loading and unloading of film. Accordingly, a film cartridge 4 has been loaded into film cartridge compartment 3. Film cartridge 4 is a typical APS type film cartridge which includes a film wind-up shaft 41 (hereinafter "shaft 41") that is axially disposed therein.

Disposed within film cartridge compartment 3 is an opening and closing lever 5 which is configured as an "L" shaped member which includes a vertical portion that extends from a top side of film cartridge compartment 3 to a horizontal portion that extends in a direction parallel to the bottom of film cartridge 4. Opening and closing lever 5 is movable in a direction parallel to shaft 41 of film cartridge 4 and in accordance with spring 17a. Accordingly, as opening and closing lever 5 is movable, the horizontal portion thereof forms a movable platform. An operating lever 5d is part of opening and closing lever 5 and is configured to be manually operable to open and close film cartridge compartment 3 and, in particular, film cartridge compartment cover 2 (as shown in FIG. 2). Operating lever 5d is accessible and operable from the outside of the body of camera 1. Additionally, opening and closing lever 5 is equipped with claws such as claw 5c which are discussed in detail below.

Figure 4:
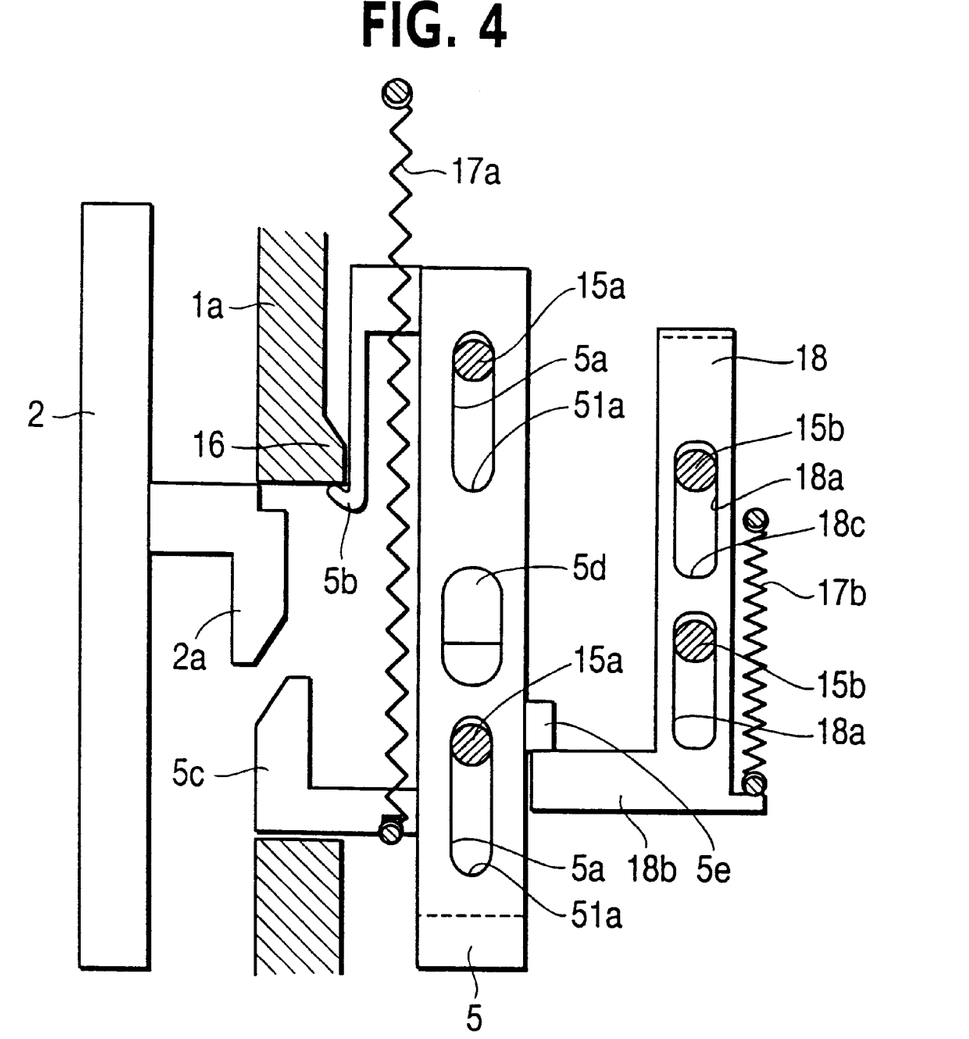
FIG. 4 is a perspective view of the film cartridge compartment depicted in FIG. 3 taken from the direction indicated by arrow D.

Operable with opening and closing lever 5 is a lever 18 which is used to apply a downward force against film cartridge 4 such as when film cartridge 4 is to be unloaded from film cartridge compartment 3. Lever 18 is normally urged upward in accordance with a spring 17b as shown in FIG. 4.

A lower spindle shaft 6 is mounted on a base plate 7 which, in turn, is mounted on a surface side of the horizontal portion of opening and closing lever 5. Base plate 7 is mounted to opening and closing lever 5 by fasteners 8 such as screws or other fastening devices. Lower spindle 9 is fitted on lower spindle shaft 6 and is movable in an axial direction so as to operatively engage with a lower end cavity A of shaft 41 of film cartridge 4. Normally, lower spindle 9 is urged upward in accordance with a spring 10.

Opposite to lower spindle 9 in film cartridge compartment 3, is upper spindle 11. Upper spindle 11 is configured to operatively engage with an upper end cavity B of shaft 41 of film cartridge 4.

Next to upper spindle 11, is a turning spindle 14 that is used to open and close a light shielding door (not shown) of film cartridge 4 by being operatively placed into a cavity C. Turning spindle 14 is configured to cooperate with a gear 13 that is operable to rotate in accordance with a motor (not shown). Gear 13 is configured and positioned to engage and cooperate with a gear 20. Gear 20 is operatively coupled to a rotary lever 22 via a coupling member 21. A locking member 23 is maintained at the end of rotary lever 22 and is configured to be placed into a notch 5f of opening and closing lever 5 in a releasable manner.

As will be described below, the arrangement of lower spindle 9 and base plate 7 in conjunction with locking member 23 and notch 5f and other structures disposed within film cartridge compartment 3 comprise the film strip protection system that is maintained within film cartridge compartment 3. As discussed below, the film strip protection system maintained within film cartridge compartment 3 prevents and restricts the movement of a film strip so that it does not improperly move and become damaged by contacting other structures maintained within camera 1.

Referring now to FIG. 4, depicted therein is a perspective view of a portion of film cartridge compartment 3 as depicted in FIG. 3 and which is taken from the direction indicated by arrow D. In particular, slotted holes 5a are formed in a side surface portion of opening and closing lever 5. As such, camera body shafts 15a of camera 1 penetrate through and are movable within slotted holes 5a. Accordingly, shafts 15a, in combination with slotted holes 5a, allow opening and closing lever 5 to move in a controlled vertical direction only.

As noted above, lever 18 is configured to operate with opening and closing lever 5 to apply a downward force against film cartridge 4. As such, slotted holes 18a are formed in lever 18 to allow shafts 15b to penetrate the same. Accordingly, the movement of lever 18 in a vertical direction, like opening and closing lever 5, is regulated by shafts 15b. As noted above, lever 18 is normally urged in an upward, vertical direction in accordance with spring 17b to allow film cartridge 4 to be loaded into film cartridge compartment 3 without interference.

A lower end portion 18b of lever 18 comes into contact with a claw 5e disposed on opening and closing lever 5. As such, when opening and closing lever 5 is operated in opposition to the urging force of the spring 17a (i.e., when operating lever 5d is moved by manual operation to open film cartridge compartment 3 by opening film cartridge compartment cover 2, or when operating lever 5d is moved by manual operation to assist in unloading film cartridge 4 from cartridge compartment 3), lever 18 is driven downward as a result of the corresponding movement of claw 5e of opening and closing lever 5.

After film cartridge 4 has been loaded into film cartridge compartment 3, film cartridge compartment 3 may be closed by closing film cartridge compartment cover 2. During such an operation, a claw 2a comes into contact with and bends claw 5b of opening and closing lever 5. As such, the bending of claw 5b causes a stop member 16 of camera body part 1a to be released from claw 5b. After such a release, opening and closing lever 5 is driven upward in accordance with spring 17a. As such, opening and closing lever 5 will move upward until shafts 15a contact lower ends 51a of slotted holes 5a, and claw 2a of cartridge compartment cover 2 becomes engaged with claw 5c. At the same time that opening and closing lever 5 moves upward, lower spindle 9 (FIG. 3) moves upward. Additionally, when opening and closing lever 5 moves upward, lever 18 (which is in contact with claw 5e) is correspondingly driven upward in accordance with spring 17b to become free (i.e., not in contact with) film cartridge 4. Lever 18 is configured to move vertically until shafts 15b come into contact with lower portions 18c of slotted holes 18a.

Figure 5:
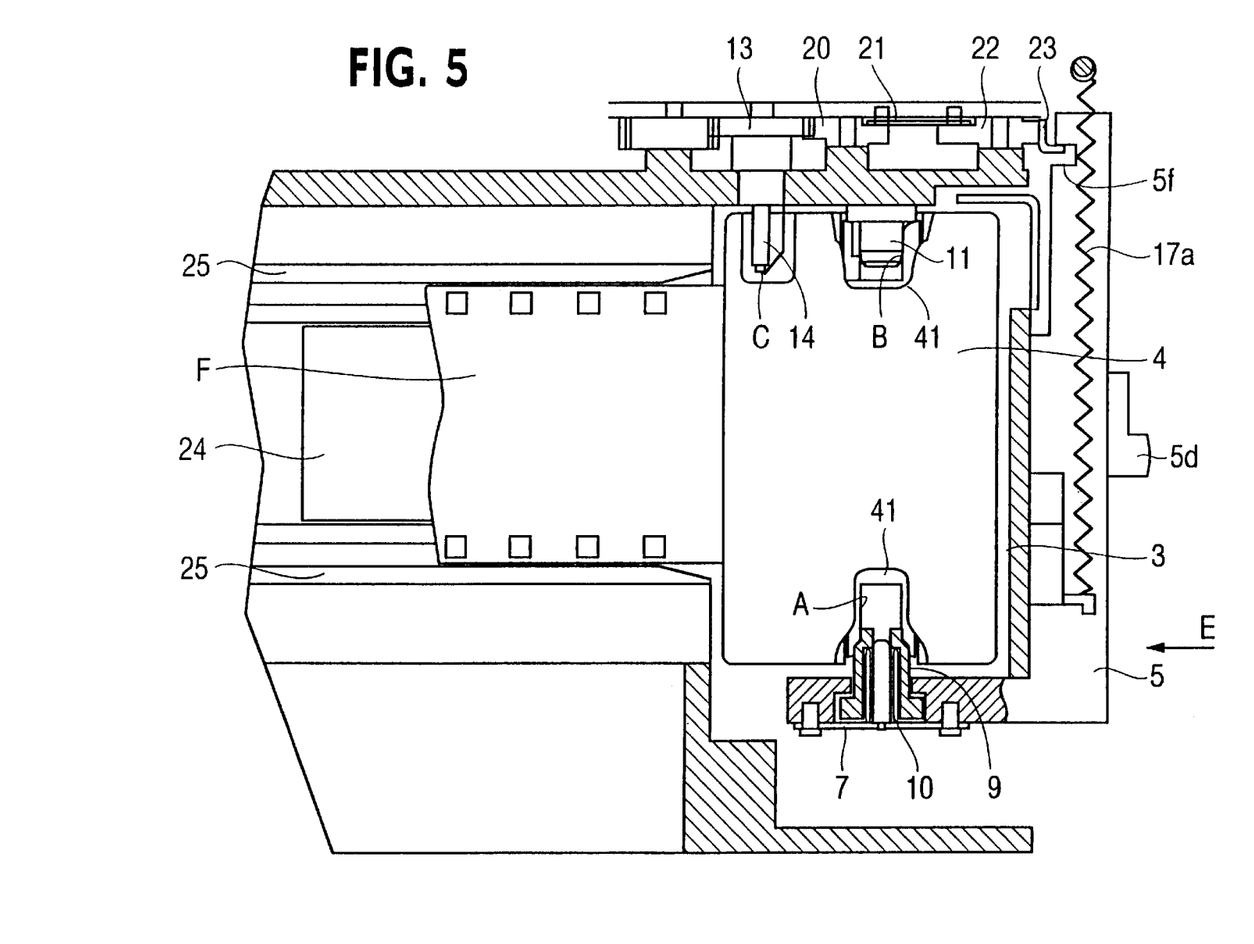
FIG. 5 is a diagram of the film cartridge compartment depicted in FIGS. 3 and 4 after it had been closed.
Figure 6:
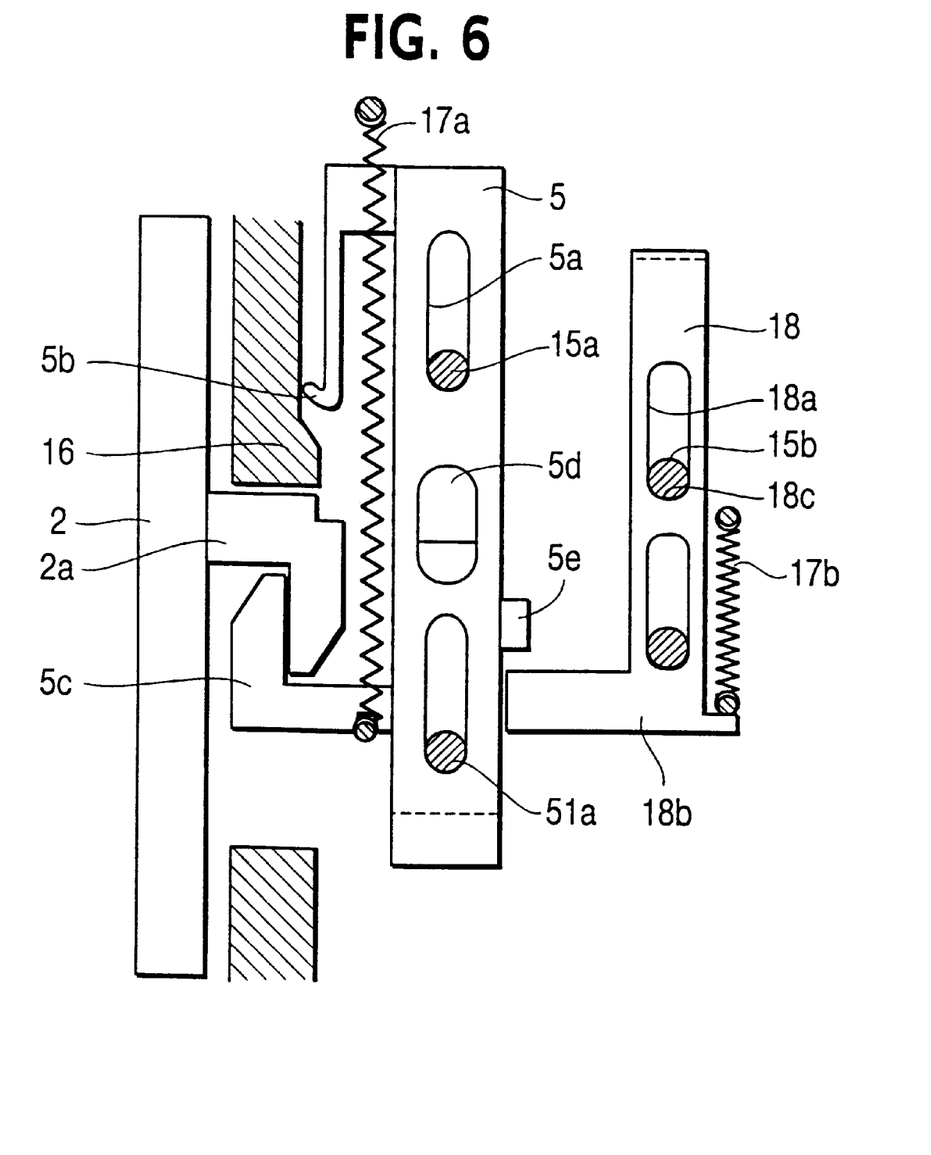
FIG. 6 is a perspective view of the film cartridge compartment depicted in FIG. 5 taken from the direction indicated by arrow E.

Referring now to FIGS. 5 and 6, depicted therein is the film cartridge compartment shown in FIG. 3 after it was closed. Accordingly, when cartridge compartment cover 2 was closed, claw 2a stopped the movement of opening and closing lever 5 by stopping and interlocking with claw 5c. Additionally, because shafts 15b came into contact with lower end portions 18c of slotted holes 18a and lever 18 thereafter stopped moving, a gap resulted between claw 5e of opening and closing lever 5 and lower end portion 18b of lever 18 as shown in FIG. 6. As such, lever 18 moved to a position where it normally remains out of contact with film cartridge 4.

Additionally, after closure of film cartridge compartment 3, lower spindle 9 was driven upward in the axial line of shaft 41 in accordance with spring 10. As such, lower spindle 9 operatively fit into cavity A of shaft 41 of film cartridge 4 thereby leaving a space or gap between a bottom surface of lower spindle 9 and a top surface of base plate 7. Moreover, when lower spindle 9 was driven upward, film cartridge 4 was driven upward, and upper spindle 11 was caused to fit into cavity B of shaft 41. At the same time, turning spindle 14 was caused to be operatively fitted into cavity C. As such, shaft 41 of film cartridge 4 is supported by lower spindle 9 and upper spindle 11. In other words, film cartridge 4 is held and suspended within film cartridge compartment 3 and, in particular, within a film cartridge holder formed by upper spindle 11 and lower spindle 9. The suspension of film cartridge 4 within film cartridge compartment 3 in the aforementioned fashion has been referred to as a "floating shell" arrangement.

Accordingly, after film cartridge 4 was loaded and suspended within film cartridge compartment 3 in a floating shell manner, turning spindle 14 was rotated by a motor (not shown) to cause a light exclusion door (not shown) of film cartridge 4 to be opened. After the light exclusion door was opened, a film strip F was advanced from film cartridge 4 and guided through a channel formed by guide rails 25 across and over a camera aperture area 24. At the same time, rotary lever 22 (coupled to gear 13) was rotated, and as such, locking member 23 was caused to be placed (in a removable manner) within notch 5f of opening and closing lever 5, thereby locking opening and closing lever 5 in place and preventing opening and closing lever 5 from moving in a downward vertical direction.

It should be recognized that locking member 23 caused opening and closing lever 5 to be locked in a position wherein lower spindle 9 (which is mounted on opening and closing lever 5) is raised within film cartridge compartment 3. This is the case because lower spindle 9 is mounted and disposed upon the movable horizontal portion of opening and closing lever 5 which was elevated in accordance with spring 17a when film cartridge compartment cover 2 was closed (as shown in FIG. 6). Accordingly, locking member 23 and notch 5f in conjunction with the arrangement of the raised lower spindle 9 and base plate 7 form the film strip protection system that prevents film strip F from improperly moving within camera 1. That is, the film strip protection system maintained within film cartridge compartment 3 will restrict the movement of film strip F when it extends from film cartridge 4 and is maintained within guide rails 25 so that film strip F does not become creased, cut, scratched, improperly bent or damaged in any other way as a result of improper film strip movement or contact with other camera structures. The operation of such structure is described in detail below with regard to FIGS. 7A and 7B.

Figure 7A:
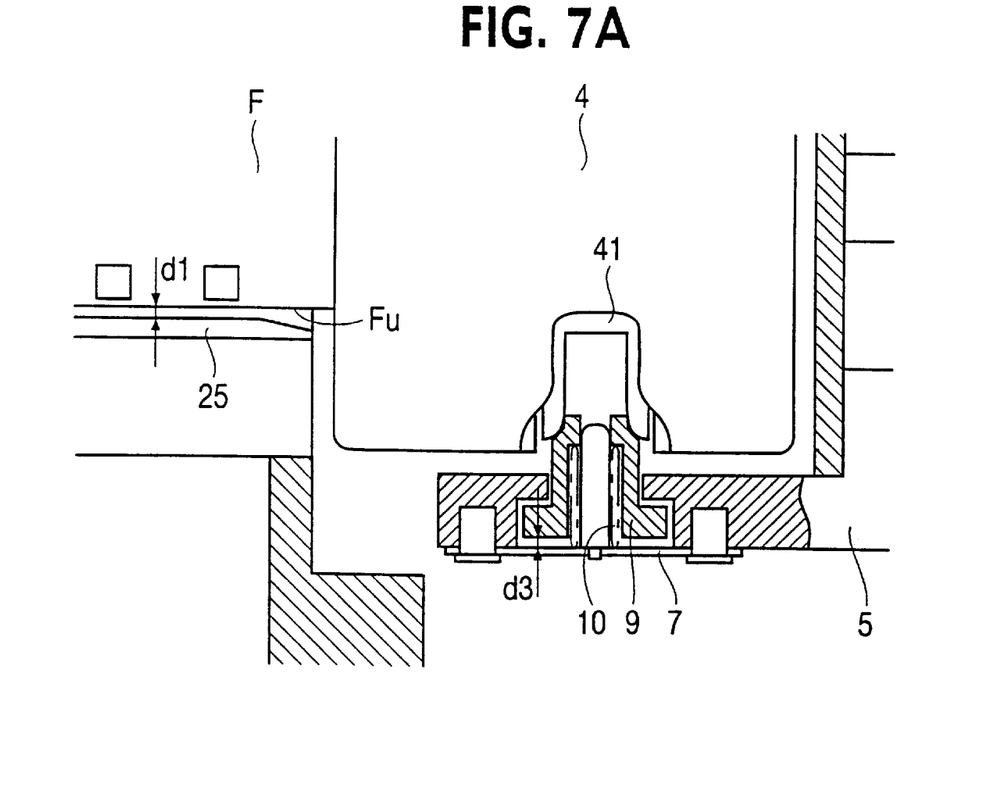
FIGS. 7A and 7B are diagrams that illustrate the operation of the film strip protection system depicted in FIGS. 3–6.
Figure 7B:
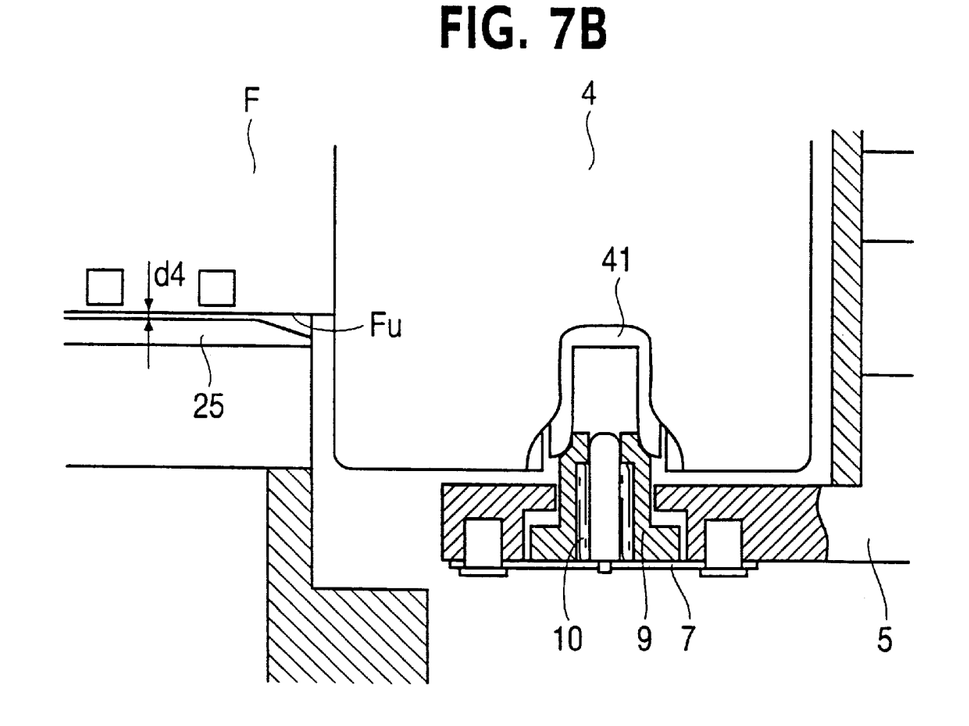

Referring now to FIGS. 7A and 7B, depicted therein are two enlarged illustrations of the structure described above and, moreover, the operation thereof. FIG. 7A illustrates the state when camera 1 is at rest or has not yet undergone movement from such things as an unexpected impact. FIG. 7B illustrates the state after camera 1 has undergone such movement.

In particular, because locking member 23 is positioned within notch 5f of opening and closing lever 5, opening and closing lever 5 cannot move downward (i.e., in a direction corresponding to the width of film strip F) even as a result of an unexpected movement realized by camera 1. As such, film cartridge 4 can only move downward to a position where the lower surface of lower spindle 9 comes into contact with the top surface of base plate 7. To illustrate this point, a gap or space between lower spindle 9 and base plate 7 is set to have a dimension d3. Additionally, under normal circumstances, a gap exists between the bottom portion Fu of film strip F and film guide rail 25 which has a dimension of d1. The relationship of d1 to d3 has been set to d1>d3 (i.e., d1 is greater than d3).

Accordingly, after lower spindle 9 comes into contact with base plate 7 as shown in FIG. 7B, a clearance between the bottom portion Fu of film strip F and guide rail 25 is realized. That clearance is equal to d4 which is further equal to d1–d3 (i.e., d1 minus d3). As such, because of the film strip protection system maintained within film cartridge compartment 3, there is no interference between film strip F and guide rail 25 even in a situation where camera 1 undergoes an unexpected movement. Thus, damage to film strip F is avoided by the operation of the structure described above and, in particular, the operation of locking member 23 and notch 5f in conjunction with the arrangement of lower spindle 9 and base plate 7.

It should be understood that although there will be no interference between film strip F and guide rail 25 if dimension d3 is set to 0.5 mm or less, the present invention is not so limited. Many other dimensions may be chosen depending on particular design requirements. Preferably, however, the relationship of d1 to d3 or d1>d3 (i.e., d1 is greater than d3) should be maintained.

Moreover, it should be appreciated that since dimension d3 is relatively small (e.g., 0.5 mm or less), there is less of a chance that spindle 9 will be caused to rock or tilt as a result of camera movement. Accordingly, the chance of having film strip F realize creases or other similar damage is minimized since film cartridge 4 will not rock or tilt when supported by spindle 9. Thus, the film strip protection system disposed within film cartridge compartment 3 will prevent damage to film strip F by limiting the vertical movement of film strip F and by preventing any rocking or tilting movement of spindle 9 and film cartridge 4.

Figure 8A:
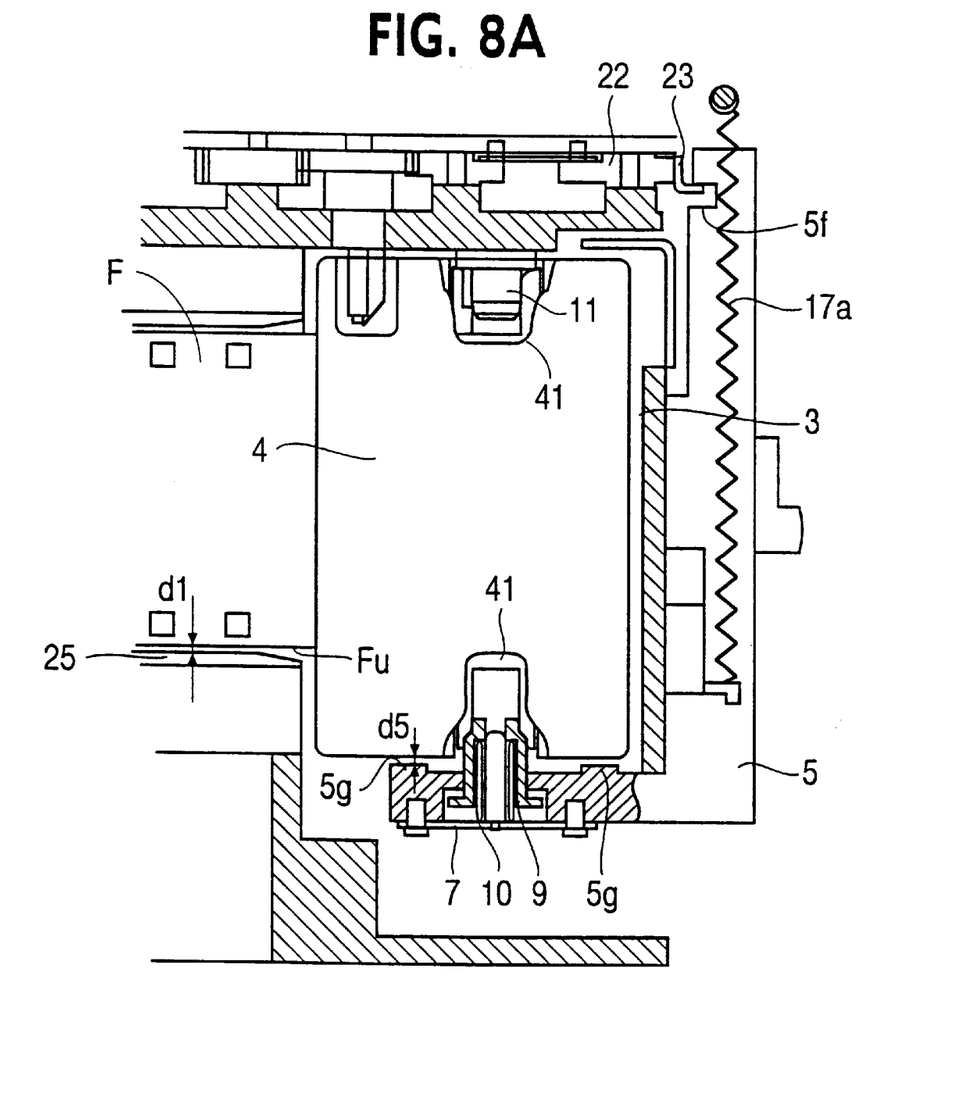
FIGS. 8A and 8B are diagrams that respectively illustrate another preferred embodiment of the present invention and the corresponding operation thereof.
Figure 8B:
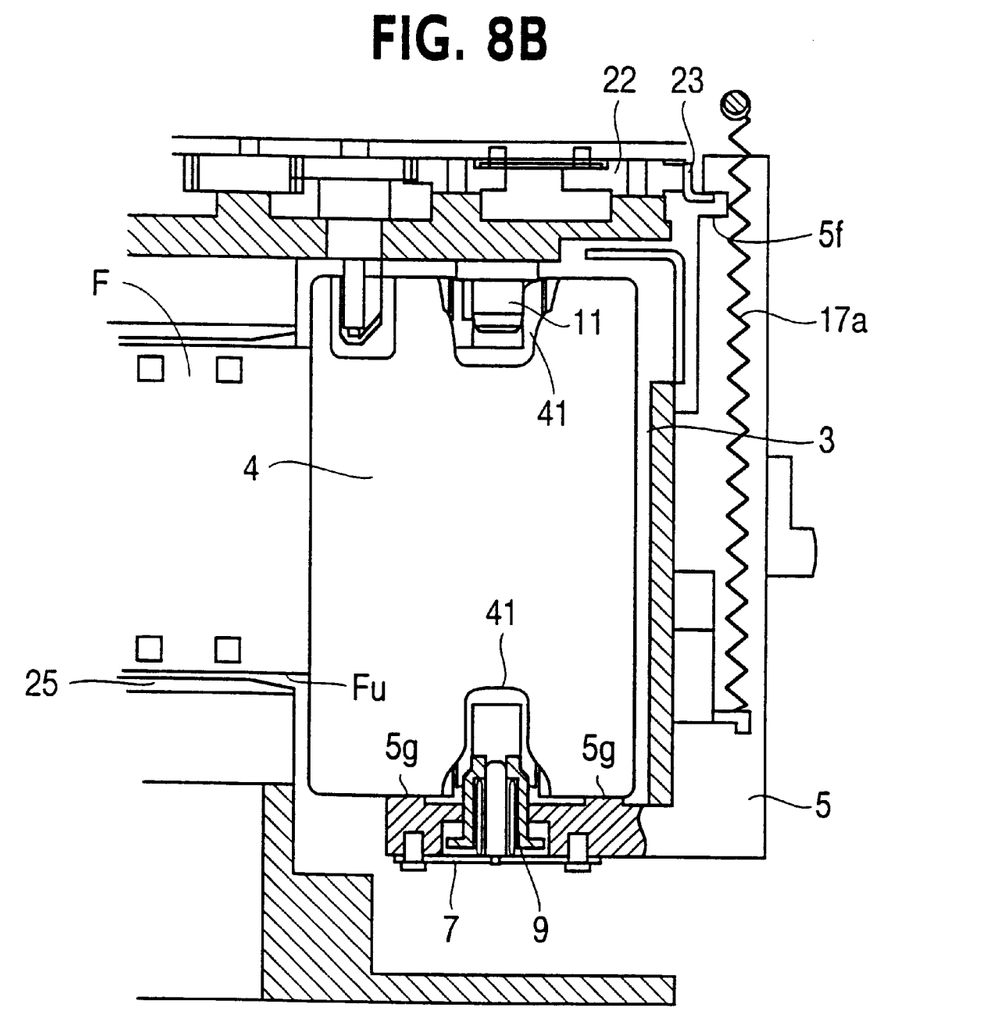

Referring now to FIGS. 8A and 8B, depicted therein is a another preferred embodiment of a film strip protection system that may be incorporated into camera 1. Many of the structures illustrated are similar or like those discussed in detail above. Accordingly, for purposes of brevity, a detailed discussion of such similar or like structures is omitted.

In FIG. 8A, opening and closing lever 5 has been modified to include protrusions 5g (e.g., movement stopping members) disposed upon an upper or inner surface side of the horizontal portion of opening and closing lever 5. Protrusions 5g are raised to contact film cartridge 4 should the same move as a result of movement of camera 1. As such, protrusions 5g will act as movement stopping members. Of course, protrusions 5g could be configured as a raised, circular or other shaped structure that would be positioned to contact film cartridge 4 should the same move as a result of movement of camera 1. Accordingly, reference to plural protrusions is not meant to limit the present invention. To the contrary, any number of raised objects that may be used to stop or otherwise inhibit movement of film cartridge 4 and film strip F may be incorporated. Additionally, it should be understood that protrusions 5g may be produced as injection molded, plastic formations on opening and closing lever 5.

Under normal circumstances (e.g., when camera 1 is at rest or when camera 1 has not undergone movement that causes film cartridge 4 to move after it has been enclosed within film cartridge compartment 3), a gap or space having dimension d5 exists between the top surfaces of protrusions 5g and the bottom surface side of film cartridge 4. As described above with regard to the embodiment illustrated in FIGS. 7A and 7B, another gap or space exists between a lower portion Fu of film strip F and a lower film guide rail 25 which has a dimension of d1. Preferably, dimensions d1 and d5 should be set and related such that d5<d1 (i.e., d5 is less than d1).

Preferably, dimension d5 should be set to 0.5 mm or less. However, the present invention is not so restricted as other dimensions may be chosen depending on particular camera body design requirements. Accordingly, the preferred dimension of 0.5 mm or less should not be considered as limiting the present invention.

As such, protrusions 5g in conjunction with locking member 23 and notch 5f of opening closing lever 5 form a film strip protection system to prevent film strip F from improperly moving and becoming damaged by other camera structures (e.g., guide rail 25, etc.) as a result of movement of film cartridge 4. That is, protrusions 5g in conjunction with locking member 23 and notch 5f form a film strip protection system that prevents film strip F from becoming damaged as a result of moving and improperly coming into contact with a film guide rail or another structure maintained within the film travel path of film strip F within camera 1. The operation of this film strip protection system is described with reference to FIG. 8B.

Referring now to FIG. 8B, depicted therein is the film cartridge compartment shown in FIG. 8A after film cartridge 4 moved (e.g., downward) as a result of movement realized by camera 1. In particular, film cartridge 4 moved as far as dimension d5 and to the point that film cartridge 4 contacted protrusions 5g. As such, film strip F and lower film guide rail 25 did not come into contact with each other because protrusions 5g stopped film cartridge 4 from moving thereby stopping film strip F from moving. It should be recognized that although lower spindle 9 and base plate 7 were raised as a result of being maintained on opening and closing lever 5, lower spindle 9 and base plate 7 were not needed to limit the movement of film strip F. In other words, the film strip protection system formed by locking member 23 and notch 5f (of opening and closing lever 5) in conjunction with protrusions 5g was sufficient to restrict the movement of film strip F so that it did not improperly move within camera 1.

The embodiments described above were configured to operate within camera 1 which includes a rear-entry or back-entry type film cartridge compartment. The present invention, however, is not so restricted. In fact, a camera having a bottom-entry film cartridge compartment similarly may take advantage of the novel features of the present invention to prevent film strip damage. For example, a bottom-entry type camera can incorporate structures like protrusions 5g with a film cartridge compartment cover unit to limit and control the movement of an enclosed film cartridge and film strip that extends therefrom. In the case of a bottom-entry type camera, a film cartridge compartment cover can be considered as a movable platform on which protrusions 5g may be disposed.

Figure 9:
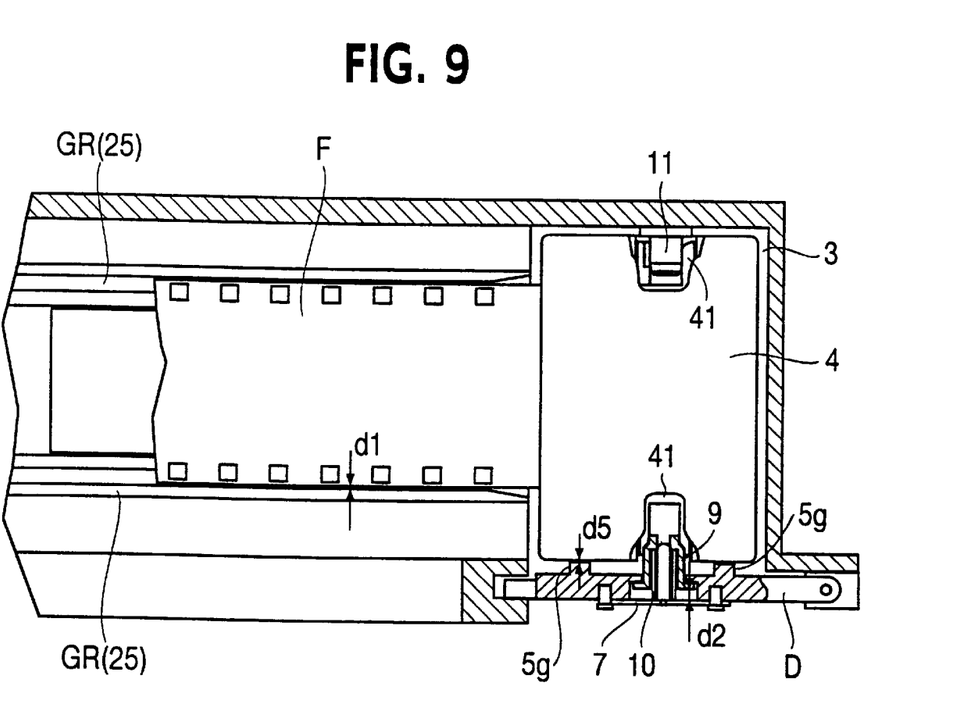
FIG. 9 is a diagram that illustrates a camera body having a bottom-entry type film cartridge compartment and one that includes film cartridge movement limiting protrusions according to a preferred embodiment of the present invention.

Referring now to FIG. 9, depicted therein is a camera body having a bottom-entry type film cartridge compartment and one that includes film cartridge movement limiting protrusions according to a preferred embodiment of the present invention. In particular, a film cartridge compartment cover door D has protrusions 5g formed/disposed thereon to prevent film cartridge 4 from moving toward door D. In effect, protrusions 5g also prevent film strip F from moving beyond and becoming damaged by a film guide rail GR (25). Such operation results because distance d1 normally is greater than distance d5 thus preventing film strip F from improperly moving such as attempting to or in fact moving beyond guide rail GR (25).

Additionally, although APS cameras, APS film cartridges, and APS film strips were used to illustrate the novel features of the present invention, the present invention is not so restricted. Other types of cameras that utilize film cartridges and film strips of different formats may be fitted with the structures of the present invention to prevent film strips from becoming damaged (e.g., by other camera structures) as a result of camera movement.

Thus, having fully described the present invention by way of example with reference to the attached drawing figures, it will be readily appreciated that many changes and modifications may be made to the invention and to the embodiments shown and/or described herein without departing from the spirit or scope of the present invention which is defined in and covered by the appended claims.

What is claimed is:

1. A camera, comprising:
   a film cartridge holder for holding a film cartridge, said film cartridge maintaining a film strip, said film cartridge holder having a first support member supporting a first end of said film cartridge and a second support member supporting a second end of said film cartridge, said second support member urging said film cartridge toward said first support member;
   a guide rail disposed within the camera to guide said film strip when said film strip extends from said film cartridge; and
   a limiting unit limiting movement of said film cartridge and said film strip when said film strip extends from said film cartridge, said limiting unit limiting the movement of said film cartridge and said film strip in a direction toward said second support member to prevent said film strip from moving beyond said guide rail.

2. The camera according to claim 1, wherein said limiting unit limits the amount of movement of said film cartridge by limiting the movement of said second support member.

3. The camera according to claim 1, wherein said first support member has a spindle member configured to be operatively inserted into a corresponding cavity of a shaft maintained within said film cartridge and exposed at said first end of said film cartridge.

4. The camera according to claim 1, wherein second support member has a movable spindle member configured to be operatively inserted into a corresponding cavity of a shaft maintained within said film cartridge and exposed at said second end of said film cartridge, said limiting unit limiting movement of said film cartridge and said film strip by limiting movement of said movable spindle member.

5. The camera according to claim 1, wherein said camera further includes a spring member causing said second support member to urge said film cartridge toward said first support member.

6. The camera according to claim 1, further comprising a film cartridge holder cover and a opening and closing lever, said opening and closing lever configured to allow said film cartridge holder cover to be opened and closed, said second support member disposed on said opening and closing lever.

7. The camera according to claim 1, further comprising a camera body, said film cartridge holder being accessible from a back side of said camera body.

8. The camera according to claim 1, further comprising a camera body, said film cartridge holder being accessible from a bottom side of said camera body.

9. The camera according to claim 1, further comprising a notch disposed within said film cartridge holder, and said limiting unit includes a locking member configured to engage with said notch and to limit the movement of said film cartridge and said film strip.

10. The camera according to claim 1, wherein said second support member is disposed on a movable platform and said limiting unit includes a stopping member disposed upon said movable platform, said stopping member stopping movement of said film strip in a direction toward said second support member.

11. The camera according to claim 10, wherein said movable platform is disposed on a film cartridge holder cover, said film cartridge holder cover configured to enclose said film cartridge within the camera.

12. The camera according to claim 10, wherein said movable platform is a film cartridge holder cover, said film cartridge holder cover configured to enclose said film cartridge within the camera.

13. The camera according to claim 1, wherein said second support member is disposed on a movable lever and said limiting unit further comprises a base member disposed on said movable lever and configured to limit the movement of said second support member, and a locking unit for preventing said movable lever from moving in a direction toward said second support member.

14. The camera according to claim 1, wherein said second support member is disposed on a movable lever and said limiting unit further comprises a locking unit for preventing said movable lever from moving in a direction toward said second support member, and a stopping member disposed on said movable lever and configured to limit the movement of said film cartridge and said film strip.

15. The camera according to claim 14, wherein said stopping member includes a plurality of protrusions arranged to stop said film cartridge from moving in a direction toward said second support member.

16. The camera according to claim 1, wherein said limiting member prevents said film cartridge from moving more than 0.5 mm in a direction toward said second support member.

17. A camera, comprising:
- a film cartridge compartment for maintaining a film cartridge having a film strip disposed therein, said film cartridge being movable within said film cartridge compartment, said film strip configured to retractably extend from said film cartridge;
- a film strip guide unit for maintaining and guiding said film strip when said film strip extends from said film cartridge; and
- a film strip movement restriction system disposed within said film cartridge compartment for restricting movement of said film cartridge to prevent said film strip from moving beyond said film strip guide unit.

18. The camera according to claim 17, further comprising a camera body, said film cartridge compartment being accessible from a back side of said camera body.

19. The camera according to claim 17, further comprising a camera body, said film cartridge compartment being accessible from a bottom side of said camera body.

20. The camera according to claim 17, wherein said film cartridge compartment is configured to receive an advanced photo system (APS) film cartridge.

21. The camera according to claim 17, wherein said film strip guide unit is a film strip guide rail for guiding said film strip across an aperture area of the camera.

22. The camera according to claim 17, further comprising:
- a first support member disposed in said film cartridge compartment for supporting a first end of said film cartridge;
- a second support member disposed in said film cartridge compartment for supporting a second end of said film cartridge, said second support member urging said film cartridge in a direction toward said first support member; and
- as part of said film strip movement restriction system, a locking unit limiting the movement of said film cartridge and said film strip in a direction toward said second support member.

23. The camera according to claim 17, wherein said film strip movement restriction system includes a locking member configured to limit the movement of said film strip in a direction toward said film strip guide unit.

24. The camera according to claim 17, further comprising:
- a first support member disposed in said film cartridge compartment for supporting a first end of said film cartridge;
- a second support member disposed in said film cartridge compartment for supporting a second end of said film cartridge, said second support member urging said film cartridge in a direction toward said first support member, said second support member disposed on a movable platform; and
- as part of said film strip movement restriction system, a stopping member disposed on said movable platform for stopping said film cartridge and said film strip from moving in a direction toward said second support member.

25. A camera adapted to accept a film cartridge maintaining a film strip, comprising:
- a film strip guide unit for maintaining said film strip when it extends over an aperture area of the camera; and
- a movement prevention system for preventing said film strip from moving beyond said film strip guide unit.

26. The camera according to claim 25, wherein said film strip guide unit includes a plurality of guide rails guiding said film strip over said aperture area when said film strip extends from the said cartridge.

27. The camera according to claim 25, wherein said film strip guide unit includes a plurality of guide rails forming a channel in which said film strip is maintained when said film strip extends over said aperture area, said movement prevention system preventing said film strip from leaving said channel when said film strip extends from said film cartridge.

28. The camera according to claim 25, further comprising a camera body having a rear-entry film cartridge compartment, said movement prevention system being disposed within said rear-entry film cartridge compartment.

29. The camera according to claim 25, further comprising a camera body having a bottom-entry film cartridge compartment, said movement prevention system being disposed within said bottom-entry film cartridge compartment.

30. The camera according to claim 25, further comprising a cartridge compartment door having a stopping member disposed thereon, said stopping member being part of said movement prevention system.

31. The camera according to claim 25, further comprising:
- a film cartridge suspension system for holding a film cartridge, said film cartridge suspension system including a movable support member having a movable spindle member configured to engage with a corresponding receiving end of said film cartridge; and
- a locking member for preventing said movable support member and said movable spindle member from moving so that said film strip is prevented from improperly moving within said film strip guide unit.

32. The camera according to claim 25, wherein said movement prevention system includes a movable film cartridge support member having a movable spindle member configured to engage with a corresponding receiving end of said film cartridge, and a locking member for preventing said movable support member and said movable spindle member from moving so that said film strip is prevented from improperly moving within said film strip guide unit.

33. A film strip protection system for a camera having a film strip guide member for guiding a film strip when a film strip extends from a film cartridge maintained within the camera, comprising:
- a movement prevention system disposed within a film cartridge compartment of said camera, said movement prevention system preventing said film strip from moving beyond said film strip guide member.

34. The film strip protection system according to claim 33, wherein said movement prevention system further comprises:
- a support member for supporting said film cartridge within said film cartridge compartment, said support member having a movable spindle member supporting an end of said film cartridge, a base plate for stopping said movable spindle member from moving, and a locking notch; and
- a locking member operative with said locking notch for preventing said support member from moving, whereby said film strip is prevented from improperly contacting said film strip guide member when said locking member is placed within said notch and said movable spindle member comes into contact with said base plate.

35. The film strip protection system according to claim 33, wherein said camera includes a camera body and said support member further comprises a operation lever operable by manual operation from an outer area of said camera body.

36. The film strip protection system according to claim 33, wherein said movement prevention system further comprises:

a support member for supporting said film cartridge within said film cartridge compartment, said support member having a stop member facing an end of said film cartridge and a locking notch; and a locking member operative with said locking notch for preventing said support member from moving, whereby said film strip is prevented from improperly contacting said film strip guide member when said locking member is placed within said notch and said film cartridge comes into contact with said stop member.

37. The film strip protection system according to claim 36, wherein said stop member includes a plurality of protruding members.

38. The film strip protection system according to claim 36, wherein said stop member is a circularly shaped protruding member.

39. The film strip protection system according to claim 33, wherein said movement prevention system further comprises:

a support member supporting said film cartridge; and a stop member disposed on said support member, said stop member facing an end of said film cartridge, whereby said film strip is prevented from improperly contacting said film guide member when said film cartridge contacts said stop member.

40. The film strip protection system according to claim 33, wherein said movement prevention includes a stop member, said stop member facing an end of said film cartridge, whereby said film strip is prevented from contacting said film guide member when said film cartridge contacts said stop member.

\* \* \* \* \*